United States Patent
Gupta et al.

[11] Patent Number: 5,829,619
[45] Date of Patent: Nov. 3, 1998

[54] ADAPTER FOR MOTOR VEHICLE FUEL FILLER PIPES

[75] Inventors: Rajendra N. Gupta, Rochester Hills; R. Donald Hollinger, Royal Oak, both of Mich.

[73] Assignee: General Motors Corporation, Detroit, Mich.

[21] Appl. No.: 905,520

[22] Filed: Aug. 4, 1997

[51] Int. Cl.[6] .................................................. B65D 31/00
[52] U.S. Cl. ........................................... 220/86.2; 141/45
[58] Field of Search ................................ 220/86.2, 86.3, 220/DIG. 33; 141/44, 45, 59

[56] References Cited

U.S. PATENT DOCUMENTS

| | | | |
|---|---|---|---|
| 3,187,936 | 6/1965 | Downing | 220/86 |
| 3,907,153 | 9/1975 | Mutty | 220/86 R |
| 4,881,578 | 11/1989 | Rich et al. | 141/44 |
| 4,958,655 | 9/1990 | Danek | 137/80 |

*Primary Examiner*—Steven M. Pollard
*Attorney, Agent, or Firm*—Patrick M. Griffin; Saul Schwartz

[57] ABSTRACT

An adapter defining a transition between a motor vehicle fuel filler pipe having a concentric vapor exhaust passage and a motor vehicle fuel filler pipe having a parallel vapor exhaust passage. The fuel filler pipe having a parallel vapor exhaust passage includes a rigid stem accessible from outside of the motor vehicle, a flexible hose attached to the rigid stem, and a parallel hose connected to the rigid stem by an upper fluid connector. The filler pipe having a concentric vapor exhaust passage includes a rigid outer tube on the fuel tank and a rigid inner tube inside of the rigid outer tube and cooperating therewith in defining a concentric vapor exhaust passage around the rigid inner tube. The adapter according to this invention includes a sleeve between the flexible hose and the rigid outer tube and a baffle in the sleeve concurrently funneling liquid fuel from the flexible hose to the rigid inner tube while diverting displaced fuel vapor in the concentric vapor exhaust passage into the parallel vapor exhaust passage through a fluid connector on the sleeve.

4 Claims, 2 Drawing Sheets

ADAPTER FOR MOTOR VEHICLE FUEL FILLER PIPES

TECHNICAL FIELD

This invention relates to an adapter defining a transition between a motor vehicle fuel filler pipe having a concentric vapor exhaust passage and a motor vehicle fuel filler pipe having a parallel vapor exhaust passage.

BACKGROUND OF THE INVENTION

A motor vehicle usually includes a fuel tank and a conduit for introducing liquid fuel into the fuel tank commonly referred to as a "filler pipe" having an inboard end attached to the fuel tank and an outboard end accessible from outside the motor vehicle by a nozzle of a filling station fuel pump. In some motor vehicles,, fuel vapor displaced from the fuel tank by liquid fuel entering through the filler pipe exhausts through a parallel vapor exhaust passage in a hose parallel to the filler pipe. The parallel hose has an inboard end connected to the fuel tank separate from the filler pipe and an outboard end connected to the filler pipe near the outboard end of the latter. In other motor vehicles, fuel vapor displaced from the fuel tank by liquid fuel entering through the filler pipe exhausts through a concentric vapor exhaust passage defined between the filler pipe and a hose around the filler pipe. The concentric vapor exhaust passage is preferable to the parallel vapor exhaust passage for simplicity and compactness except when the filler pipe traverses a serpentine path on a body of the motor vehicle to the fuel tank. In the latter circumstance, the concentric vapor exhaust passage is susceptible to blockage by kinking of the hose around the filler pipe. Where a motor vehicle chassis may accept several different body styles, some of which may require the fuel filler pipe to traverse a serpentine path to the fuel tank, manufacturing costs are negatively impacted because separate fuel tanks suitable fuel filler pipes having concentric vapor exhaust passages and for parallel vapor exhaust passages must be designed, acquired, and stocked.

SUMMARY OF THE INVENTION

This invention is a new and improved adapter defining a transition between a motor vehicle fuel filler pipe having a concentric vapor exhaust passage and a motor vehicle fuel filler pipe having a parallel vapor exhaust passage. The fuel filler pipe having a parallel vapor exhaust passage includes a rigid stem accessible from outside of the motor vehicle by a nozzle of a filling station fuel pump, a flexible hose attached to the rigid stem for traversing a serpentine path on a body of the motor vehicle to the fuel tank, and a parallel hose connected to the rigid stem by an upper fluid connector. The filler pipe having a concentric vapor exhaust passage includes a rigid outer tube on the fuel tank and a rigid inner tube inside of the rigid outer tube and cooperating therewith in defining a concentric vapor exhaust passage around the rigid inner tube. The adapter according to this invention includes a sleeve between the flexible hose and the rigid outer tube and a baffle in the sleeve funneling liquid fuel from the flexible hose to the rigid inner tube while concurrently diverting displaced fuel vapor in the concentric vapor exhaust passage into the parallel vapor exhaust passage through a fluid connector on the sleeve. In a preferred embodiment, the baffle in the adapter sleeve is integral with the inner rigid tube of the fuel filler pipe having a concentric vapor exhaust passage.

DESCRIPTION OF THE PREFERRED EMBODIMENT

Figure 1:
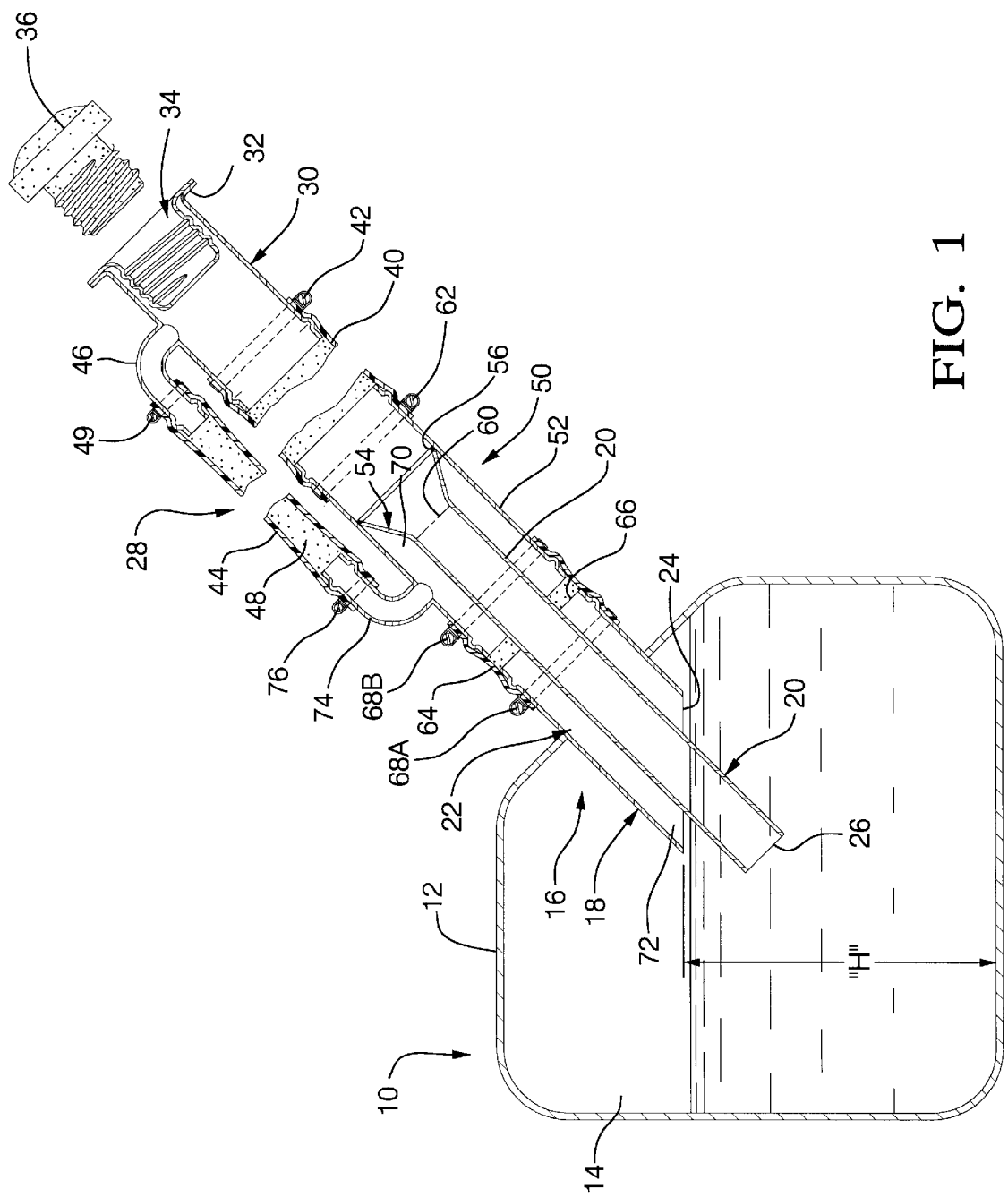
FIG. 1 is an elevational view in cross section of an adapter according to this invention defining a transition between a fuel filler pipe having a concentric vapor exhaust passage and a fuel filler pipe having a parallel vapor exhaust passage.

Referring to the drawings, a schematically represented motor vehicle fuel tank 10 is mounted on a chassis, not shown, of the motor vehicle and includes a wall structure 12 which defines a fuel chamber 14 inside the tank. A lower fuel filler pipe 16 characterized as having a concentric fuel vapor exhaust passage includes an outer rigid tube 18 mounted on the fuel tank wall structure 12 and an inner rigid tube 20 inside of the outer tube and cooperating therewith in defining a concentric vapor exhaust passage 22, FIG. 1. The outer rigid tube 18 has an inboard end 24 in the fuel chamber 14 at an elevation "H" above the bottom of the tank. The inner rigid tube 20 has an inboard end 26 in the fuel chamber 14 below the inboard end 24 of the rigid outer tube 18 and may be reinforced by struts, not shown, spanning the concentric vapor exhaust passage 22.

An upper fuel filler pipe 28 characterized as having a parallel vapor exhaust passage includes a rigid tubular stem 30 having a flange 32 at one end thereof for attachment of the stem to the aforesaid vehicle body of the motor vehicle. The stem is accessible from outside of the motor vehicle body by the aforesaid filling station pump nozzle. A cup-shaped shield 34 inside of the stem 30 has screw threads for retention of a cap 36 which seals closed the upper fuel filler pipe 28 when the cap is screwed into the shield. The shield 34 has a center aperture 38 for the aforesaid filling station pump nozzle and a plurality of perforations, not shown, around the center aperture.

A large diameter flexible liquid delivery hose 40 of the upper fuel filler pipe 28 is clamped to the end of the stem 30 opposite the flange 32 by a hose clamp 42 and spans a serpentine path, not shown, on the motor vehicle body from the stem 30 to near the fuel tank 10. A smaller diameter flexible parallel hose 44 is connected to the stem 30 through an upper fluid connector 46 on the stem and defines a parallel vapor exhaust passage 48, FIG. 1, following substantially the same serpentine path traversed by the flexible hose 40. A hose clamp 49 clamps the parallel flexible hose 44 to the upper fluid connector 46. An adapter 50 according to this invention defines a transition between the lower and the upper fuel filler pipes 16, 28.

Figure 2:
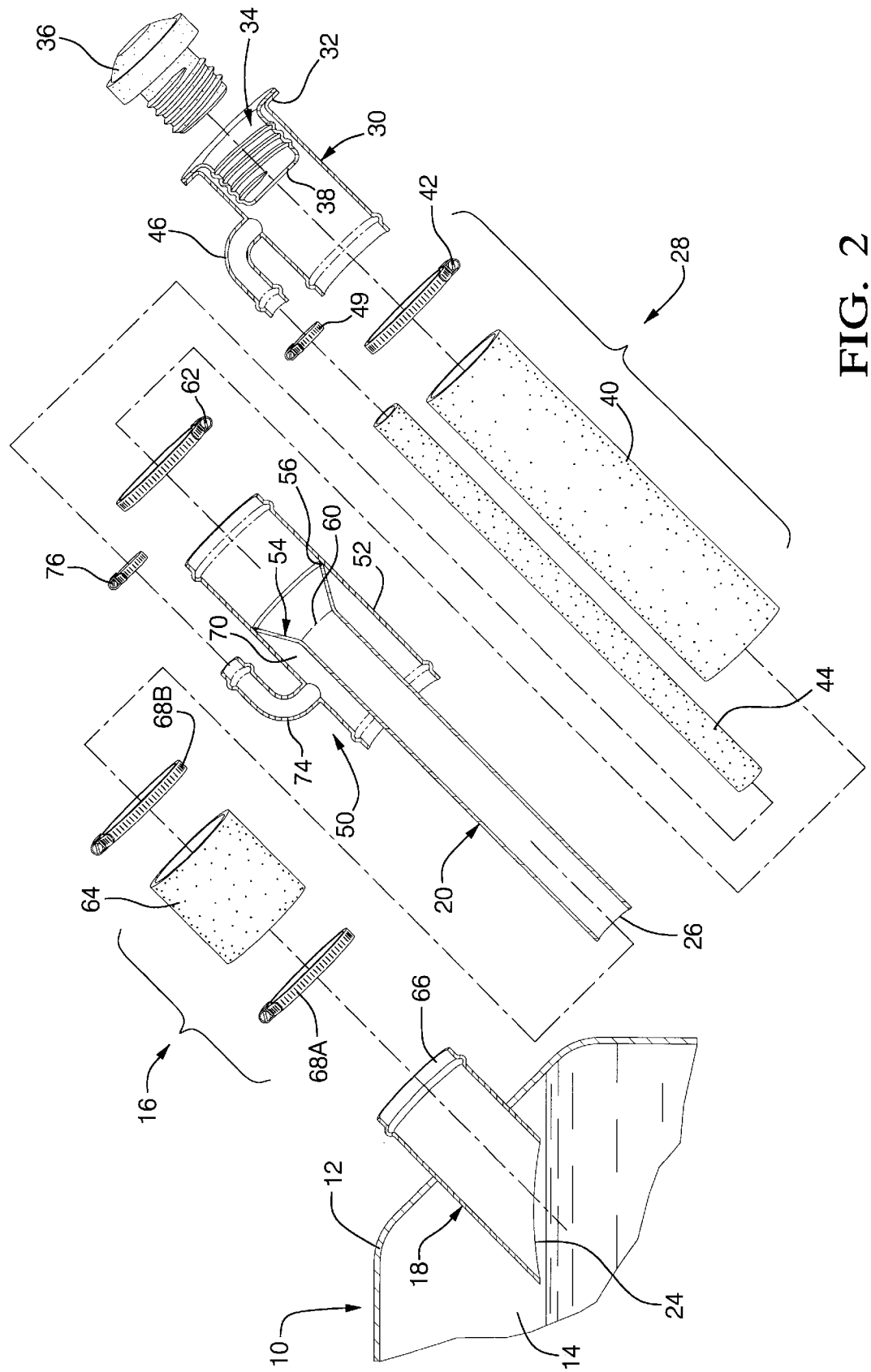
FIG. 2 is a partially broken-away, exploded perspective view of the adapter according to this invention between a fuel filler pipe having a concentric vapor exhaust passage and a fuel filler pipe having a parallel vapor exhaust passage.

The adapter 50 includes a sleeve 52 and a frustoconical baffle 54 inside of the sleeve. The baffle 54 has a circular outer edge 56 welded to the sleeve 52 and a circular inner edge juxtaposed an inboard end 60 of the rigid inner tube 20 of the lower fuel filler pipe 18. The rigid inner tube 20 may be made integral with the frustoconical baffle 54 as illustrated in FIGS. 1–2 or it may be attached to the baffle by welding or other suitable fluid-tight connection. The end of the large diameter flexible hose 40 of the upper fuel filler pipe 28 opposite the stem 30 envelopes the sleeve 52 and is sealed against the sleeve by a hose clamp 62.

An intermediate hose 64 envelopes an outboard end 66 of the rigid outer tube 18 of the lower fuel filler pipe 16 and the end of the sleeve 52 of the adapter 50 opposite the flexible hose 40. A pair of hose clamps 68A, 68B seal the intermediate hose against the rigid outer tube 18 and against the sleeve 52 so that the frustoconical baffle 54 closes an outboard end 70 of the concentric vapor exhaust passage 22 opposite an inboard end 72 thereof at the inboard end 24 of the rigid outer tube. The end of the parallel hose 44 of the upper fuel filler pipe 28 opposite the upper fluid connector 46 envelopes a lower fluid connector 74 rigidly attached to the sleeve 52 of the adapter 50 and is sealed against the lower fluid connector by a hose clamp 76.

To add liquid fuel to the fuel tank 10, the cap 36 is removed from the stem 30 of the upper fuel filler pipe 28 and the aforesaid filling station pump nozzle is inserted into the center aperture 38 in the shield 34. Liquid fuel dispensed by the filling station nozzle into the upper fuel filler pipe 28 is directed into the inner rigid tube 20 of the lower fuel filler pipe 16 by the frustoconical baffle 54 of the adapter 50 and from the inner rigid tube into the fuel chamber 14 of the fuel tank. Fuel vapor in the fuel chamber 14 displaced by incoming liquid fuel enters the concentric vapor passage 22 through the inboard end 72 thereof and then is directed by the frustoconical baffle 54 into the lower fluid connector 74. Displaced fuel vapor is conducted from the lower fluid connector 74 to the stem 30 of the upper fuel filler pipe 28 below the shield 34 through the parallel vapor exhaust passage 48 defined by the parallel hose 44 and through the upper fluid connector 46. The aforesaid perforations in the shield 34 accommodate migration of fuel vapor across the shield.

When the surface level of liquid fuel in the fuel chamber 14 of the fuel tank 10 attains the elevation "H" and closes the inboard end 72 of the concentric vapor exhaust passage 22, fuel vapor trapped above the liquid fuel prevents further liquid fuel from entering the tank and thereby initiates cessation of the fuel flow from the filling station pump nozzle in the usual fashion. Importantly, the adapter 50 renders the fuel tank 10 suitable for use on motor vehicles having bodies where the path traversed by the fuel filler pipe to the fuel tank is straight and, therefore, suitable for filler pipes having only concentric vapor exhaust passages, and where the path traversed by the fuel filler pipe to the fuel tank is more serpentine and, therefore, more suitable for filler pipes having parallel vapor exhaust passages. Accordingly, the adapter 50 minimizes manufacturing costs because a motor vehicle manufacturer is required to only design, acquire and stock one fuel tank for multiple body styles.

Having thus described the invention, what is claimed is:

1. In a motor vehicle, the combination comprising:

a fuel tank, a lower fuel filler pipe on said fuel tank including an inner tube having an inboard end in said fuel tank and an outer tube around said inner tube having an inboard end in said fuel tank and cooperating with said inner tube in defining a concentric vapor exhaust passage having an inboard end in said fuel tank, an upper fuel filler pipe including a stem accessible from outside of said motor vehicle by a filling station pump nozzle and a flexible liquid delivery hose operative to traverse a serpentine path from said stem to near said fuel tank and a parallel hose connected to said stem and defining a parallel vapor exhaust passage generally parallel to said flexible liquid delivery hose, and an adapter means operative to connect said flexible liquid delivery hose of said upper fuel filler pipe exclusively to an outboard end of said inner tube of said lower fuel filler pipe so that liquid fuel dispensed into said upper fuel filler pipe is delivered to said fuel tank through said lower fuel filler pipe and to connect said concentric vapor exhaust passage around said inner tube of said lower fuel filler pipe exclusively to said parallel vapor exhaust passage in said parallel hose of said upper fuel filler pipe so that fuel vapor displaced from said fuel tank is transported to said stem of said upper fuel filler pipe.

2. The combination in a motor vehicle recited in claim 1 wherein said adapter means comprises:

a tubular sleeve having a first end connected to said flexible liquid delivery hose of said upper fuel filler pipe and a second end connected to said outer tube of said lower fuel filler pipe, a baffle on said tubular sleeve sealingly connected to said tubular sleeve and to said inboard end of said inner tube of said lower fuel filler pipe operative to direct liquid fuel from said flexible liquid delivery hose of said upper fuel filler pipe exclusively to said inner tube of said lower fuel filler pipe while concurrently closing an outboard end of said concentric vapor exhaust passage, and a fluid connector on said tubular sleeve in fluid communication with each of said concentric vapor exhaust passage around said inner tube of lower fuel filler pipe and said parallel vapor exhaust passage in said parallel hose of said upper fuel filler pipe.

3. The combination in a motor vehicle recited in claim 2 wherein:

said inner tube of said lower fuel filler pipe is integral with said baffle on said tubular sleeve of said adapter means.

4. The combination in a motor vehicle recited in claim 2 wherein:

said baffle on said tubular sleeve is a frustoconical baffle.

* * * * *